US007019941B2

(12) United States Patent
Yoo

(10) Patent No.: US 7,019,941 B2
(45) Date of Patent: Mar. 28, 2006

(54) FILTERING APPARATUS OF HARD DISK DRIVE

(75) Inventor: Yong-chul Yoo, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 20 days.

(21) Appl. No.: 10/617,173

(22) Filed: Jul. 11, 2003

(65) Prior Publication Data

US 2004/0006954 A1 Jan. 15, 2004

(30) Foreign Application Priority Data

Jul. 11, 2002 (KR) .............................. 2002-40407

(51) Int. Cl.
*G11B 17/02* (2006.01)

(52) U.S. Cl. .................................................. 360/97.02

(58) Field of Classification Search ............ 360/97.02, 360/97.03

See application file for complete search history.

(56) References Cited

U.S. PATENT DOCUMENTS 4,888,655 A * 12/1989 Bonn ...................... 360/97.03

FOREIGN PATENT DOCUMENTS

JP 2-281495 11/1990
KR 2000-50563 8/2000

* cited by examiner

*Primary Examiner*—Robert S. Tupper
(74) *Attorney, Agent, or Firm*—Staas & Halsey LLP

(57) ABSTRACT

A filtering apparatus of a hard disk drive includes a filter filtering particles from air flowing inside a housing which includes a base plate and a cover plate, and two holders installed inside the housing and having support grooves supporting both end portions of the filter. The filter includes a filtering portion through which the flowing air passes and particles are filtered from the flowing air, and an insertion portion included at both end portions of the filtering portion and inserted into the support grooves forming a seal. Thus, since no gap is generated between the support groove of the holder and the insertion portion of the filter, all the air flowing toward the filter passes through the filtering portion. Also, the flow of air passing through the filtering portion is smooth, so that an efficiency of filtering tiny particles included in the air flowing in the hard disk drive is improved.

23 Claims, 8 Drawing Sheets

FILTERING APPARATUS OF HARD DISK DRIVE

CROSS-REFERENCE TO RELATED APPLICATIONS

This application claims the priority of Korean Patent Application No. 2002-40407 filed Jul. 11, 2002 in the Korean Intellectual Property Office, the disclosure of which is incorporated here in in its entirety by reference.

BACKGROUND OF THE INVENTION

1. Field of the Invention

The present invention relates to a filtering apparatus of a hard disk drive, and more particularly, to a filtering apparatus of a hard disk drive having an improved structure so that filtering efficiency is improved.

2. Description of the Related Art

Hard disk drives (HDDs), one of the auxiliary memory devices of a computer, read data stored from a magnetic disk and record data on the magnetic disk using a magnetic head.

FIG. 1 is a perspective view illustrating a hard disk drive adopting a conventional filtering apparatus. Referring to FIG. 1, a hard disk drive includes a housing 10, a spindle motor 30 installed inside of the housing 10 to rotate a magnetic disk (a hard disk) 20, an actuator 40 having a magnetic head (not shown) to record data on the disk 20 and to reproduce data from the disk 20, and a filtering apparatus 50 to filter tiny particles existing inside the housing 10.

The housing 10 is installed in a main body of a computer and includes a base plate 11 to support the spindle motor 30 and the actuator 40, and a cover plate 12 coupled to the base plate 11 to protect the disk 20 by encompassing the same.

The actuator 40 is installed on the base plate 11 to pivot around a pivot shaft 47 by a voice coil motor 48. The actuator 40 includes an arm 46 coupled to the pivot shaft 47 to pivot and a suspension 44 installed on the arm 46 to support a slider 42, on which the magnetic head is mounted, to be elastically biased toward a surface of the disk 20.

The disk 20 is a recording medium to record data and one or a plurality of disks can be included in the computer and are separated a predetermined distance from each other and rotatable by a spindle motor 30.

The filtering apparatus 50 filters and removes tiny particles such as dust existing inside the housing 10.

Tiny particles may remain in the hard disk drive which are not completely removed during an assembly process. Also, when the hard disk drive is moved, tiny particles may be generated as the slider 42, where the magnetic head is mounted, collides against a surface of the disk 20 by an external impact, or as the slider 42 produces friction with a surface of a parking zone of the disk 20 when the disk 20 starts to rotate or stops rotating. In the meantime, in a lamp loading method, particles can be generated as a lamp and an actuator produce friction during loading and unloading of the actuator.

The tiny particles existing in the housing 10 of the hard disk drive due to a variety of reasons may contaminate the surface of the disk 20 by adhering thereto. Also, the magnetic head and the surface of the disk 20 may be damaged as tiny particles on the surface of the disk 20 collides against the magnetic head during the rotation of the disk 20. Accordingly, data recording and reproduction performance or reliability of the magnetic head may be deteriorated.

Therefore, there is a need to remove tiny particles, which cause physical damage to the magnetic head and the surface of the disk 20 and which have bad effects on the performance of the magnetic head, from the surface of the disk 20.

The filter apparatus 50 includes a recirculation filter 52 and holders 54 and 56 included on the cover plate 12 to support the filter 52. A groove 58 into which a lower end portion of the filter 52 is inserted is formed in the base plate 11.

FIGS. 2 through 4 show a conventional filtering apparatus having the above structure. FIG. 2 is a plan view of part of the cover plate where the filtering apparatus shown in FIG. 1 is installed FIG. 3 is a magnified plan view of a portion A of FIG. 2, showing the flow of air passing through the filter. FIG. 4 is a perspective view showing the recirculation filter used in the conventional filtering apparatus.

Referring to FIGS. 2 and 3, two holders 54 and 56 facing each other to support both ends of the filter 52 are included on the cover plate 12. The holder 54 protrudes from the bottom surface of the cover plate 12 and the holder 56 is integrally formed with a side wall of the cover plate 12. Support grooves 54*a* and 56*a* into which the both ends of the filter 52 are inserted are formed in the holders 54 and 56, respectively.

When the disk 20 is rotated in a direction R, the air in the housing 10 flows in the same direction. Some of the flowing air passes through the filter 52 and tiny particles such as dust included in the flowing air are filtered and removed by the filter 52.

However, as shown in FIG. 4, the filter 52 includes a filtering portion 52*a* having a structure such as a sponge through which the air can pass to filter particles and an edge portion 52*b* having a thickness thinner than that of the filtering portion 52*a* and encompassing the edge of the filtering portion 52*a*. Thus, as shown in FIG. 3, when the filter 52 having the above shape is inserted into the support grooves 54*a* and 56*a* of the holders 54 and 56, a gap is present between the support grooves 54*a* and 56*a* and the filter 52. Also, each side end portion of the filtering portion 52*a* is disposed in the support grooves 54*a* and 56*a*. Accordingly, since the filtering portion 52*a* directly contacts the side walls of the support grooves 54*a* and 56*a*, a sealing performance is deteriorated.

Due to the above structure, in the conventional filtering apparatus 50, some of the air flowing toward the filter 52 escapes through the gap between the filter 52 and the support grooves 54*a* and 56*a*, thus an efficiency in collecting tiny particles in the flowing air is deteriorated. Of the air flowing toward the filter 52, the flow of air adjacent to the support grooves 54*a* and 56*a* is curved toward both end portions of the filtering portion 52*a* disposed in the support grooves 54*a* and 56*a*. Accordingly, the smooth flow of air around the support grooves 54*a* and 56*a* is prevented so that resistance to the flow of air passing through the filter 52 increases. As a result, the amount of air flowing toward the filter 52 is reduced so that an efficiency in filtering the flowing air inside the hard disk drive is lowered.

SUMMARY OF THE INVENTION

The present invention provides a filtering apparatus of a hard disk drive having an improved structure which improves an efficiency in filtering tiny particles included in air flowing inside the hard disk drive.

According to one aspect of the present invention, there is included a filtering apparatus of a hard disk drive comprising a filter filtering particles from air flowing inside a housing which includes a base plate and a cover plate, and two holders installed inside the housing and having support grooves supporting both end portions of the filter, wherein the filter comprises a filtering portion through which the flowing air passes and particles are filtered from the flowing air, and an insertion portion included at both end portions of the filtering portion and inserted into the support grooves forming a seal.

According to the first preferred embodiment of the present invention, the insertion portion is formed by extending a material forming the filtering portion a predetermined length from both end portions of the filtering portion to have a thickness narrower than that of the filtering portion.

According to the second preferred embodiment of the present invention, the insertion portion is made of a material different from that of the filtering portion and coupled to both end portions of the filtering portion. The insertion portion is made of a material having a predetermined strength through which air cannot pass.

Additional and/or other aspects and advantages of the invention will be set forth in part in the description which follows and, in part, will be obvious from the description, or may be learned by practice of the invention.

In these preferred embodiments, a length of the filtering portion is substantially the same as an interval between two holders.

A thickness of the insertion portion and a width of the support groove are substantially the same to prevent a gap generating between the insertion portion and the support grooves. A length of the insertion portion and a depth of the support grooves are substantially the same.

According to the present invention, all of the air flowing toward the filter passes through the filtering portion and the flow of air becomes smooth, so that an efficiency of filtering tiny particles included in the flowing air inside the hard disk drive is improved.

BRIEF DESCRIPTION OF THE DRAWINGS

These and other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
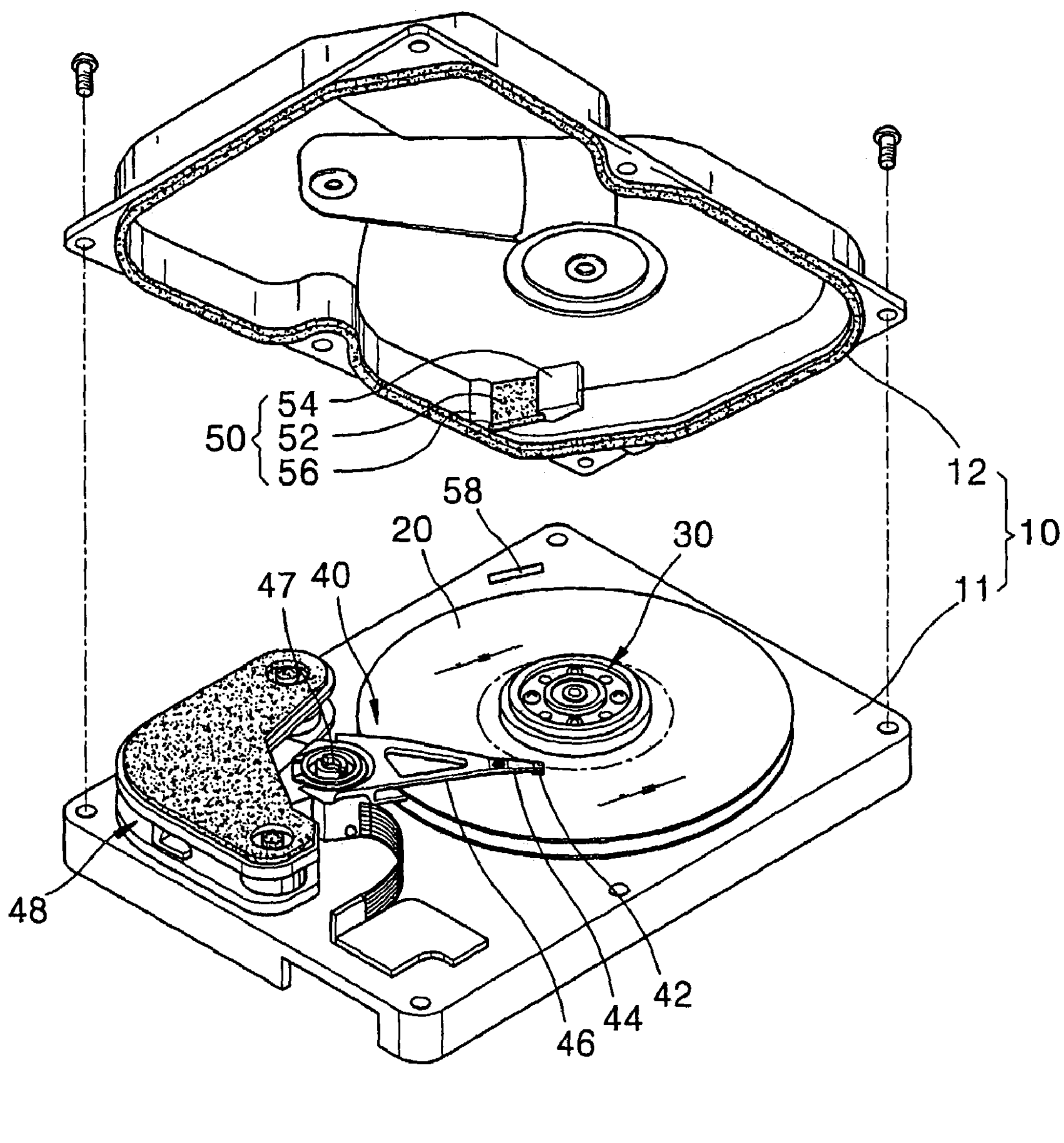
FIG. 1 is an exploded perspective view illustrating a hard disk drive adopting the conventional filtering apparatus.
Figure 2:
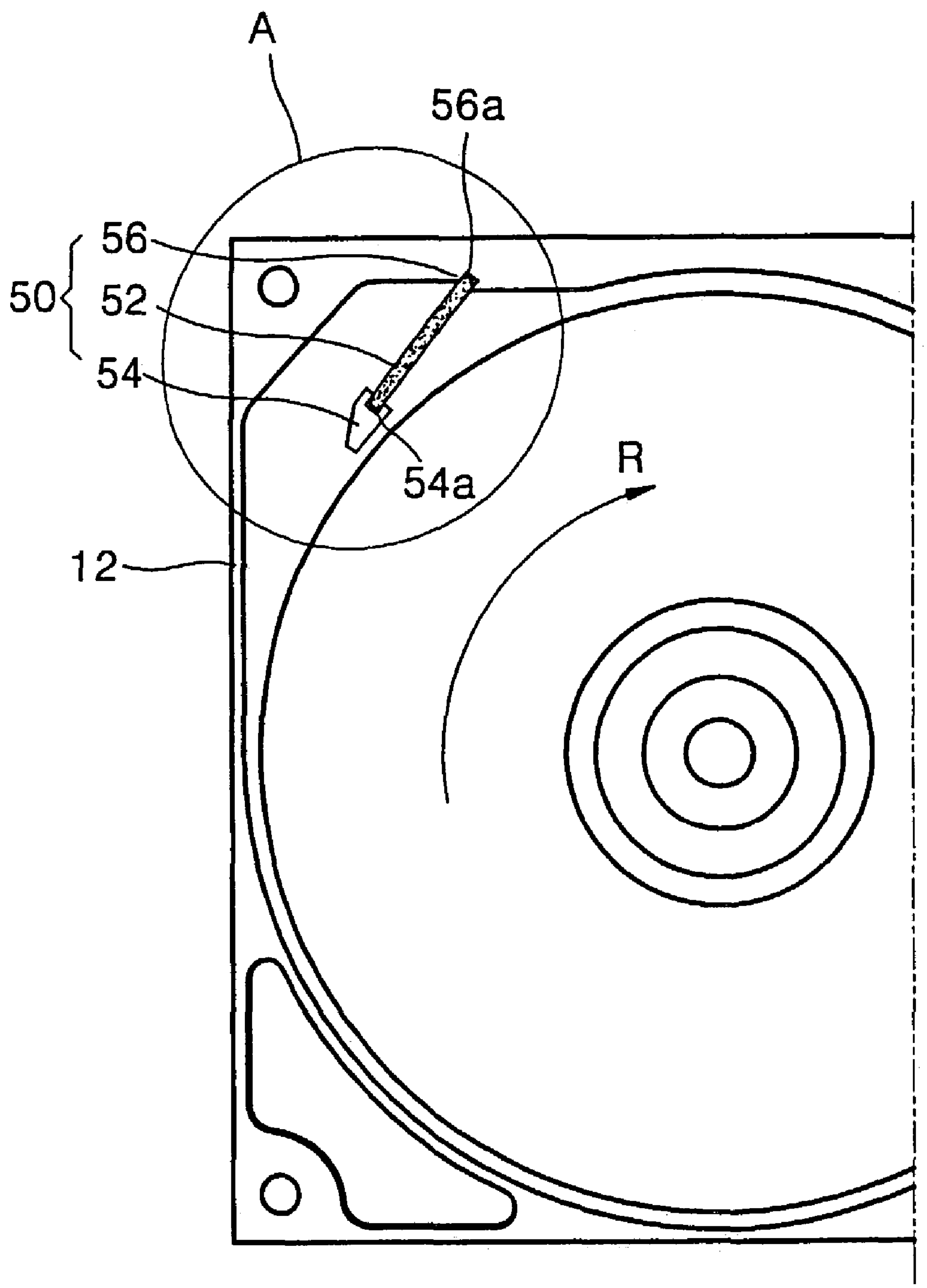
FIG. 2 is a plan view illustrating part of the cover plate where the filtering apparatus shown in FIG. 1 is installed.
Figure 3:
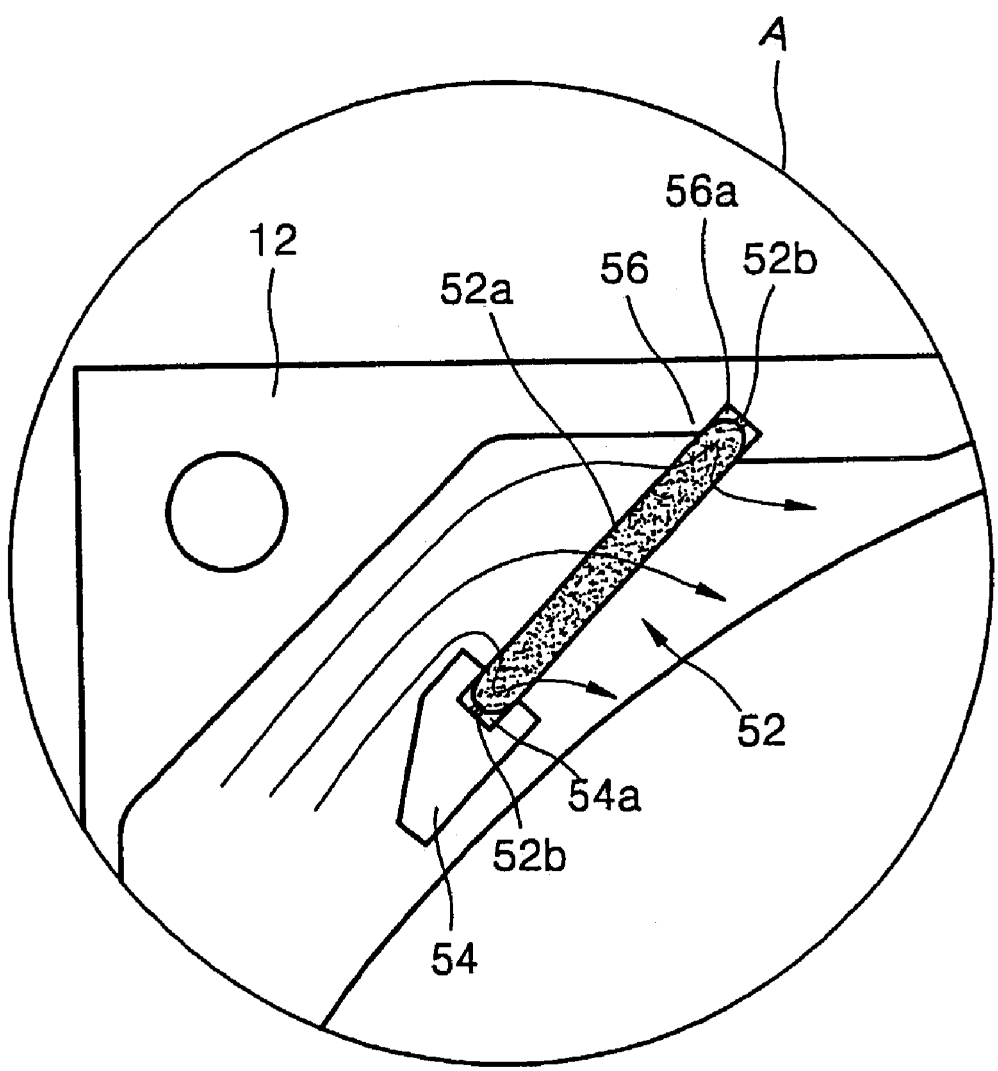
FIG. 3 is a magnified plan view illustrating the portion A of FIG. 2, showing the flow of air passing through the filter.
Figure 4:
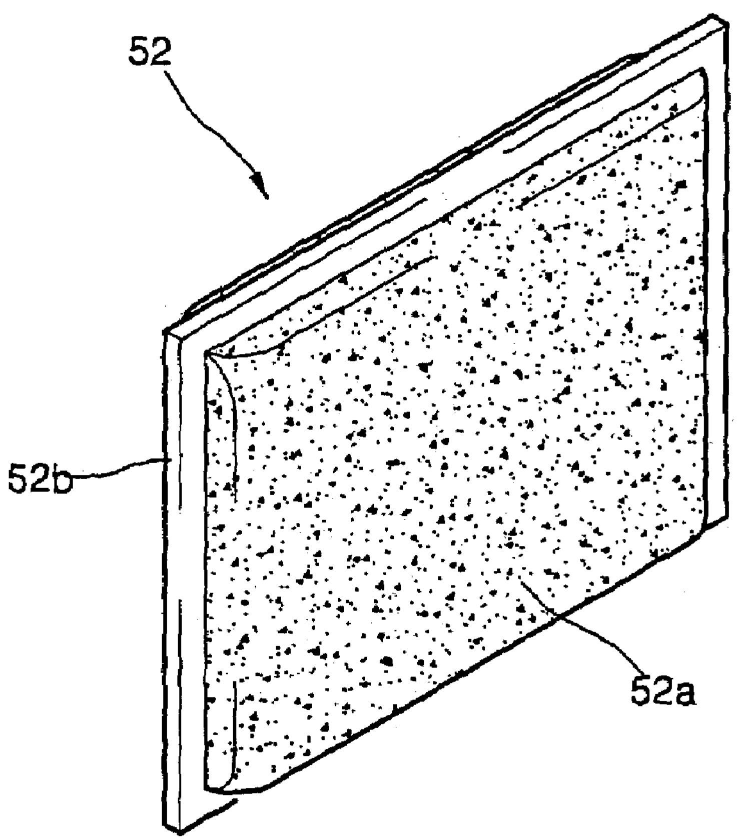
FIG. 4 is a perspective view illustrating the recirculation filter used in the conventional filtering apparatus.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 5:
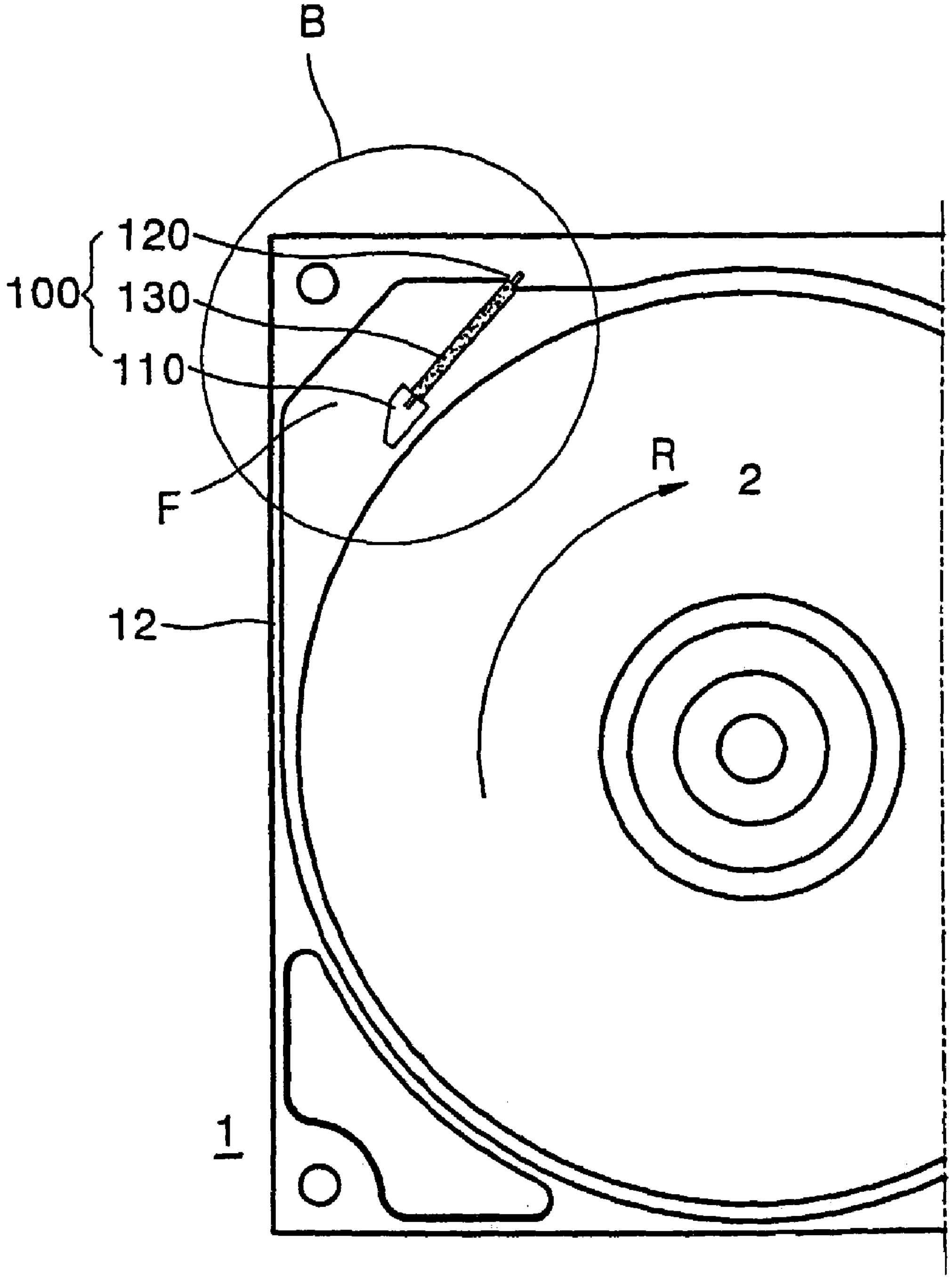
FIG. 5 is a plan view illustrating a cover plate where a filtering apparatus according to an embodiment of the present invention.
Figure 6:
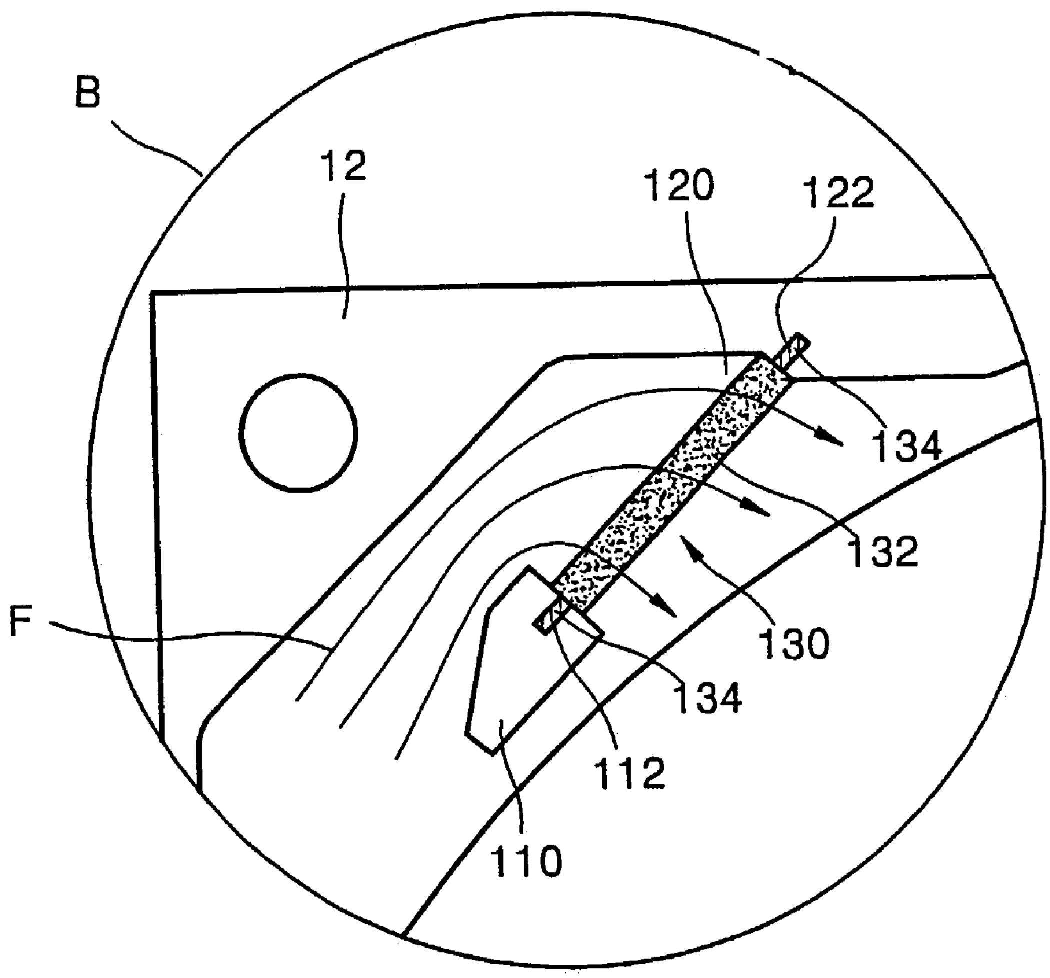
FIG. 6 is a magnified plan view illustrating the portion B of FIG. 5, showing the flow of air passing through a filter of the filtering apparatus of FIG. 5.
Figure 7:
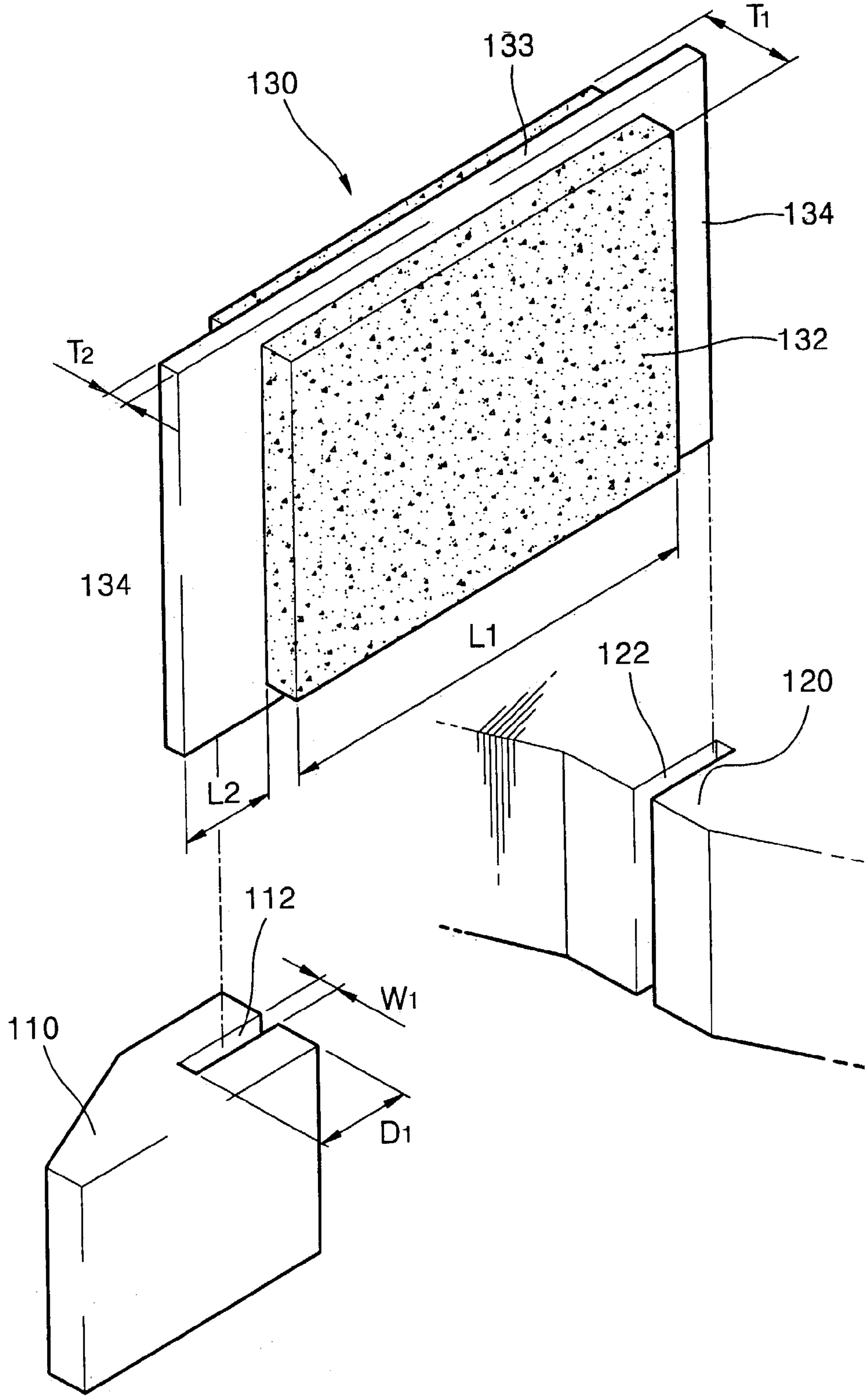
FIG. 7 is an exploded perspective view of the filtering apparatus of FIG. 5.

Referring to FIGS. 5 through 7, a hard disk drive 1 includes a housing (not shown) accommodating elements such as a disk 2, a spindle motor (not shown in FIGS. 5–7), and an actuator (not shown in FIGS. 5–7). The housing includes a base plate and a cover plate 12. Tiny particles exist inside the housing. A filtering apparatus 100 according to a first preferred embodiment of the present invention is installed inside the housing to filter and remove the particles.

When an accommodation space of a disk is formed on the cover plate 12 (see FIG. 1), the filtering apparatus 100 is installed on the cover plate 12 of the housing as shown in FIGS. 5–7. However, the above arrangement is merely an example. Accordingly, when the accommodation space is formed on the base plate 11 (see FIG. 1) of the housing, the filtering apparatus 100 of the present invention can be installed on the base plate 11, although not shown in the drawings.

The filtering apparatus 100 includes a filter 130 filtering particles from air flowing in the housing and holders 110 and 120 to support the filter 130. The holders 110 and 120 are installed on the cover plate 12, facing each other, to support both side end portions of the filter 130. The first holder 110 protrudes from the bottom surface of the cover plate 12 while the second holder 120 is formed integrally with a side wall of the cover plate 12. The two holders 110 and 120 have support grooves 112 and 122, respectively, into which both side end portions of the filter 130 are inserted.

The filter 130 includes a filtering portion 132 through which air in the housing passes and particles are filtered from the flowing air, and an insertion portion 134 included at both end portions of the filtering portion 132 and inserted into the support grooves 112 and 122 of the holders 110 and 120, forming a seal.

The filtering portion 132 is made of a porous material, such as a sponge, which is a filter medium through which air can passes to filter particles from the flowing air. In one embodiment, the length $L_1$ of the filtering portion 132 is substantially the same as an interval between the two holders 110 and 120. Thus, the filtering portion 132 is disposed only in a space between the two holders 110 and 120, and both side end portions of the filtering portion 132 are not inserted in the support grooves 112 and 122 of the holders 110 and 120. According to the filtering apparatus 100 of the present invention, the conventional problem that, of the air flowing toward the filter 130, the flow of air adjacent to the holders 110 and 120 is curved toward the support grooves 112 and 122, thus preventing a smooth flow of air, is prevented.

The insertion portion 134 is formed by extending a material forming the filtering portion 132, that is, a filter medium, from both end portions of the filtering portion 132 to a predetermined length $L_2$ with a thickness $T_2$ narrower than a thickness $T_1$ of the filtering portion 132. In one embodiment, the thickness $T_2$ of the insertion portion 134 is substantially the same as a width $W_1$ of each of the support grooves 112 and 122. Thus, since the outer surface of the insertion portion 134 closely contacts the inner wall surface of the support grooves 112 and 122, a gap is not generated therebetween. In one embodiment, a length $L_2$ of the insertion portion 134 is substantially the same as a depth $D_1$ of each of the support grooves 112 and 122. Thus, the insertion portion 134 of the filter 130 completely fills the inside of the support grooves 112 and 122 so that no space exists.

When the disk 2 is rotated in the direction R shown in FIG. 5, the air flows in the same direction in the housing as the disk 2 is rotated. Some of the flowing air flows toward the filter 130 through an air inlet path F formed between the side wall of the cover plate 12 and the first holder 110. The air flowing toward the filter 130 passes through the filtering portion 132 so that tiny particles such as dust included in the flowing air are filtered and removed. In this process, since no gap exists between the insertion portion 134 and the support grooves 112 and 122, no air escapes through the gap so that all the air flowing toward the filter 130 passes through the filtering portion 132. Also, the flow of air adjacent to the holders 110 and 120 becomes smooth so that the movement speed of the entire air increases and the amount of air filtered by the filter 130 increases. Thus, an efficiency in collecting tiny particles in the flowing air in the housing can be improved by the filtering apparatus 100 according to the present invention.

Figure 8:
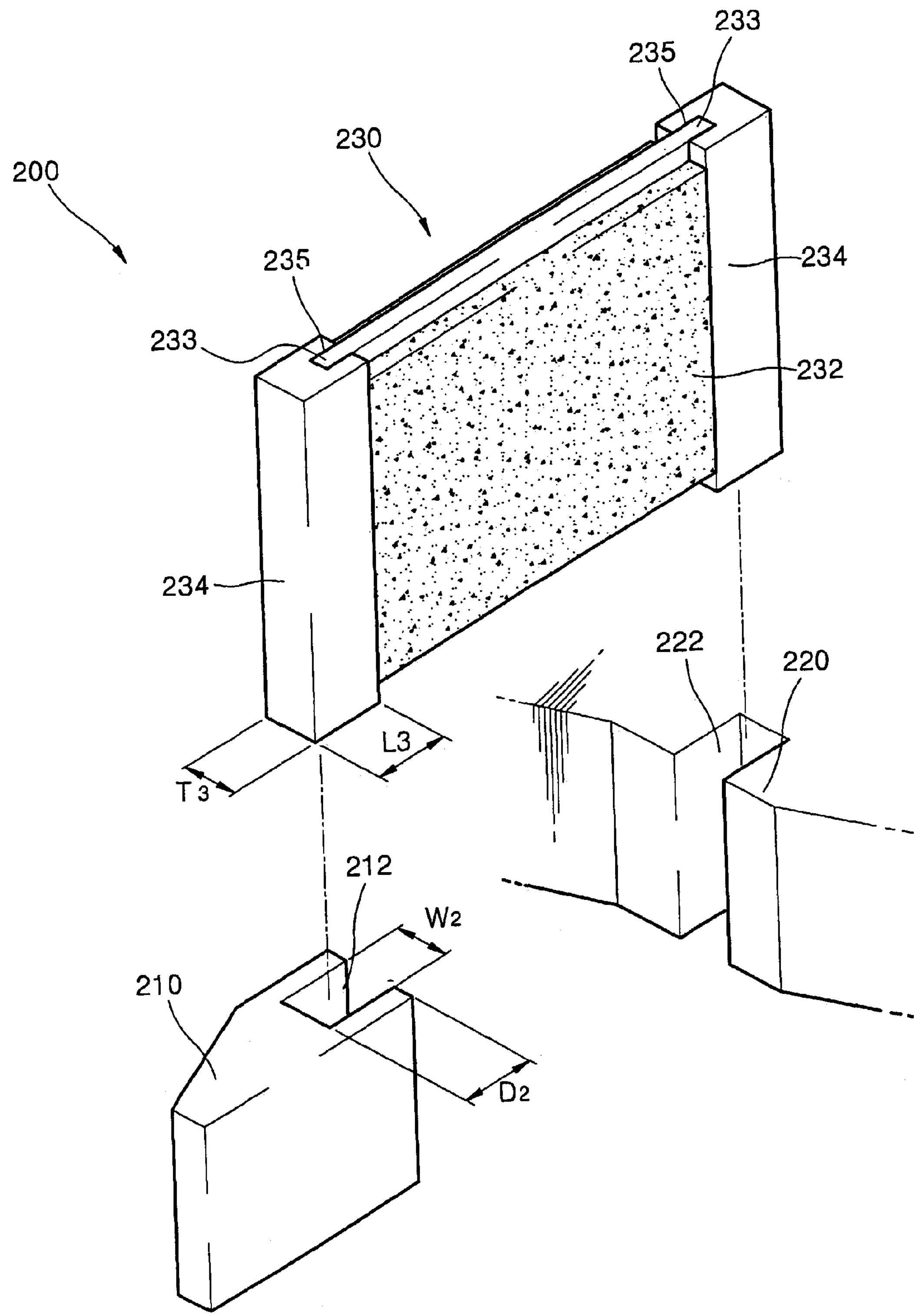
FIG. 8 is an exploded perspective view of the filtering apparatus according to a second embodiment of the present invention.

FIG. 8 is an exploded perspective view of a filtering apparatus according to a second preferred embodiment of the present invention. In the following description, different points from the first preferred embodiment of the present invention will be mainly discussed.

Referring to FIG. 8, a filtering apparatus 200 according to a second preferred embodiment of the present invention includes a filter 230 and two holders 210 and 220 as in the above-described first preferred embodiment. The filter 230 includes a filtering portion 232 and an insertion portion 234. Support grooves 212 and 222 into which the insertion portion 234 is inserted are formed in the holders 210 and 220, respectively.

In the present preferred embodiment, the insertion portion 234 is made of a material different from that of the filtering portion 232 and coupled to both end portions of the filtering portion 232. That is, while the filtering portion 232 is made of a porous filter medium, the insertion portion 234 can be made of a material having a predetermined strength such as plastic, through which air cannot pass. A groove 235 is formed in the insertion portion 234 so that an edge portion 233 formed at both end portions of the filtering portion 232 can be inserted into the groove 235. The firm coupling between the filtering portion 232 and the insertion portion 234 may be a predetermined adhesive included between the groove 235 and the edge portion 233.

The insertion portion 234 is inserted into the support grooves 212 and 222, forming a seal. For this use, in one embodiment, a thickness $T_3$ of the insertion portion 234 is substantially the same as a width $W_2$ of the support grooves 212 and 222. Also, a length $L_3$ of the insertion portion 234 is substantially the same as a depth $D_2$ of the support grooves 212 and 222. In the present preferred embodiment, since the insertion portion 234 is made of a material having a predetermined strength, as an example, plastic, the insertion portion 234 can be accurately manufactured such that the size thereof fits to that of the support grooves 212 and 222. Also, air cannot pass through the insertion portion 234. Thus, the seal between the insertion portion 234 and the support grooves 212 and 222 can be maintained more reliably.

According to the second preferred embodiment of the present invention, the same effect as in the above-described first preferred embodiment of the present invention can be obtained. Furthermore, the flow of air between the insertion portion 234 and the support grooves 212 and 222 can be surely blocked.

As described above, according to a filtering apparatus of a hard disk drive 1 according to the present invention, since no gap is generated between the support groove of the holder and the insertion portion of the filter, all the air flowing toward the filter passes through the filtering portion. Also, the flow of air passing through the filtering portion is smooth, so that an efficiency of filtering tiny particles included in the air flowing in the hard disk drive is improved.

Although a few preferred embodiments of the present invention have been shown and described with reference to preferred embodiments thereof, it would be understood by those skilled in the art that various changes in form and details may be made therein without departing from the spirit and scope of the invention as defined by the appended claims.

What is claimed is:

1. A filtering apparatus of a hard disk drive having a housing, a base plate, and a cover plate, comprising:

a filter, having end portions, filtering particles from air flowing inside the housing which includes the base plate and the cover plate; and two holders installed inside the housing and having support grooves supporting both of the end portions of the filter, wherein the filter comprises:

a filtering portion through which the flowing air passes and particles are filtered from the flowing air; and an insertion portion included at both of the end portions of the filtering portion and having a shape corresponding to a shape of the respective support groove, thereby forming a seal.

2. The apparatus as claimed in claim 1, wherein the insertion portion is formed by extending a material forming the filtering portion a predetermined length from both end portions of the filtering portion to have a thickness narrower than that of the filtering portion.

3. The apparatus as claimed in claim 1, wherein the insertion portion is made of a material different from that of the filtering portion and coupled to both end portions of the filtering portion.

4. The apparatus as claimed in claim 2, wherein a length of the filtering portion is substantially the same as an interval between two holders.

5. The apparatus as claimed in claim 2, wherein a thickness of the insertion portion and a width of the support groove are substantially the same to prevent a gap generating between the insertion portion and the support grooves.

6. The apparatus as claimed in claim 5, wherein a length of the insertion portion and a depth of the support grooves are substantially the same.

7. The apparatus as claimed in claim 3, wherein the insertion portion is made of a material having a predetermined strength through which air cannot pass.

8. The apparatus as claimed in claim 1, wherein the filtering apparatus is installed on a cover plate of the housing.

9. The apparatus as claimed in claim 3, wherein a length of the filtering portion is substantially the same as an interval between two holders.

10. The apparatus as claimed in claim 3, wherein a thickness of the insertion portion and a width of the support groove are substantially the same to prevent a gap generating between the insertion portion and the support grooves.

11. A filtering apparatus of a hard disk drive including a base plate and a cover plate, comprising:

a filter installed on the cover plate, including a filtering material having first and second ends;

a pair of insertion portions longitudinally extending from the ends of the filter; and a pair of holders abutting the base plate and cover plate and the ends of the filter, including support grooves depressed into surfaces of the holders and having a shape corresponding to a shape of insertion portions.

12. The apparatus according to claim 11, wherein the insertion portions extend a predetermined length from both ends of the filter.

13. The apparatus according to claim 12, wherein the insertion portions have a thickness narrower than that of the filter.

14. The apparatus according to claim 13, wherein a length of the filter is substantially the same as an interval between two holders.

15. The apparatus according to claim 13, wherein a thickness of the insertion portion and a width of the support grooves are substantially the same.

16. The apparatus according to claim 15, wherein a length of the insertion portion and a depth of the support grooves are substantially the same.

17. The apparatus according to claim 11, wherein the insertion portion and the filter are made of different materials.

18. The apparatus according to claim 17, wherein the insertion portion is coupled to both end portions of the filter.

19. The apparatus according to claim 18, wherein a length of the filter is substantially the same as an interval between the holders.

20. The apparatus according to claim 17, wherein a thickness of the insertion portion and a width of the support grooves are substantially the same.

21. The apparatus according to claim 20, wherein a length of the insertion portion and a depth of the support grooves are substantially the same.

22. The apparatus according to claim 17, wherein the insertion portion is made of a material having a predetermined strength through which air cannot pass.

23. The apparatus according to claim 11, wherein the insertion portions and the support grooves have an untapered shape.

* * * * *

UNITED STATES PATENT AND TRADEMARK OFFICE

CERTIFICATE OF CORRECTION

PATENT NO. : 7,019,941 B2
APPLICATION NO. : 10/617173
DATED : March 28, 2006
INVENTOR(S) : Yong-chul Yoo It is certified that error appears in the above-identified patent and that said Letters Patent is hereby corrected as shown below:

Col. 7, Line 2, after “of” insert --the--.

Signed and Sealed this

Twelfth Day of September, 2006

JON W. DUDAS

*Director of the United States Patent and Trademark Office*

UNITED STATES PATENT AND TRADEMARK OFFICE

CERTIFICATE OF CORRECTION

PATENT NO. : 7,019,941 B2
APPLICATION NO. : 10/617173
DATED : March 28, 2006
INVENTOR(S) : Yong-chul Yoo It is certified that error appears in the above-identified patent and that said Letters Patent is hereby corrected as shown below:

Col. 7, Line 2, after “of” insert --the--.

Signed and Sealed this

Twenty-eighth Day of November, 2006

JON W. DUDAS
*Director of the United States Patent and Trademark Office*